(12) United States Patent
Milojicic

(10) Patent No.: US 8,019,871 B2
(45) Date of Patent: Sep. 13, 2011

(54) FEDERATION OF GRIDS USING RINGS OF TRUST

(75) Inventor: Dejan S. Milojicic, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1014 days.

(21) Appl. No.: 11/494,101

(22) Filed: Jul. 27, 2006

(65) Prior Publication Data

US 2008/0028072 A1    Jan. 31, 2008

(51) Int. Cl.
G06F 15/173    (2006.01)

(52) U.S. Cl. .................. 709/226; 709/225; 709/241

(58) Field of Classification Search .................. 709/225, 709/226, 241
See application file for complete search history.

(56) References Cited

U.S. PATENT DOCUMENTS

| | | | |
|---|---|---|---|
| 5,937,388 A | 8/1999 | Davis | |
| 5,956,715 A | 9/1999 | Glasser | |
| 6,308,173 B1 | 10/2001 | Glasser | |
| 6,584,565 B1 | 6/2003 | Zamek | |
| 6,594,647 B1 | 7/2003 | Randle | |
| 7,020,781 B1 | 3/2006 | Saw | |
| 7,020,800 B2 | 3/2006 | Fu | |
| 7,380,129 B2 * | 5/2008 | Keohane et al. | 713/185 |
| 7,441,243 B2 * | 10/2008 | Fellenstein et al. | 718/104 |
| 7,467,303 B2 * | 12/2008 | Keohane et al. | 713/185 |
| 7,472,079 B2 * | 12/2008 | Fellenstein et al. | 705/26 |
| 7,562,035 B2 * | 7/2009 | Fellenstein et al. | 705/26 |
| 2004/0225711 A1 * | 11/2004 | Burnett et al. | 709/201 |
| 2005/0216733 A1 * | 9/2005 | Keohane et al. | 713/156 |
| 2006/0020939 A1 * | 1/2006 | Fellenstein et al. | 718/1 |
| 2006/0149652 A1 * | 7/2006 | Fellenstein et al. | 705/35 |
| 2006/0152756 A1 * | 7/2006 | Fellenstein et al. | 358/1.15 |
| 2006/0155633 A1 * | 7/2006 | Fellenstein et al. | 705/37 |

OTHER PUBLICATIONS

Llorente, et al, "A Grid Infrastructure for Utility Computing", Proceedings of 15$^{th}$ IEEE WETICE Jun. 2006.*
Pallickara, et al, "NaradaBrokering: A Distributed Middleware Framework and Architecture for Enabling Durable Peer-to-Peer Grids", IFIP 2003 LNCS 2672 pp. 41-61.*
Azzedin, F.; Maheswaran, M.; "Integrating trust into grid resource management systems", IEEE Proceedings. International Conference on Parallel Processing, 2002. Aug. 18-21, 2002 pp. 47-54.*
Humphrey, M; Thompson, M.R.; "Security implications of typical Grid Computing usage scenarios"; Proceedings. 10th IEEE International Symposium on High Performance Distributed Computing, 2001. Aug. 7-9, 2001 pp. 95-103.*
Song, et al. "Fuzzy Trust Integration for Security Enforcement in Grid Computing" Network and Parallel Computing Lecture Notes in Computer Science, 2004, vol. 3222/2004, 9-21.*

* cited by examiner

*Primary Examiner* — Patrice L Winder
*Assistant Examiner* — Julian Chang (57) ABSTRACT

A system for sharing computer resources comprises a node in a first computer grid, and one or more processing units adapted to instantiate an information path from said node to computing resources of a plurality of other grids, said information path configured as hierarchical rings of trust such that each grid of said plurality of other grids is assigned to one of a plurality of hierarchical trust levels.

23 Claims, 4 Drawing Sheets

FEDERATION OF GRIDS USING RINGS OF TRUST

TECHNICAL FIELD

The present description relates, in general, to computing grids, and, more specifically, to sharing resources among computing grids.

DESCRIPTION OF RELATED ART

Currently, many large enterprises own and operate their own computing grids in order to accommodate large amounts of processing. Processing generally includes computer code execution to provide services, such as storing and retrieving information, performing computations to change and derive information, and the like. Grids are especially popular in the fields of academic and technical computing.

In addition to private grids owned and operated by enterprises (e.g., corporations), there exist public and quasi-public grids that allow entities to buy processing power. Thus, an entity that has a large amount of processing and has access to such a grid may send some of its processing requests to the grid.

Recently, organizations have begun to federate or connect grids, thereby allowing processing from one grid to be passed to another. One such example is with the public grid, PlanetLab. An organization can share some or all of its computing power with PlanetLab, essentially becoming a part of the grid, and in return, receiving access to PlanetLab and a fraction of the grid total processing power. Another example is the practice wherein one organization buys use of another organization's grid. This is usually between corporations that have a close and preexisting business relationship.

Currently, access to outside grids in a federation is binary—it is a YES or a NO, granted or not granted. Such an arrangement opens security concerns for organizations that may desire to send various processing requests to some grids in a federation but not to others. For instance, some processing may have security concerns for the organization because it contains sensitive or secret information. The prior art offers no concept of trust and reputation among grids in a federation, and especially does not offer a hierarchical trust scheme among grids in a federation.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Figure 1:
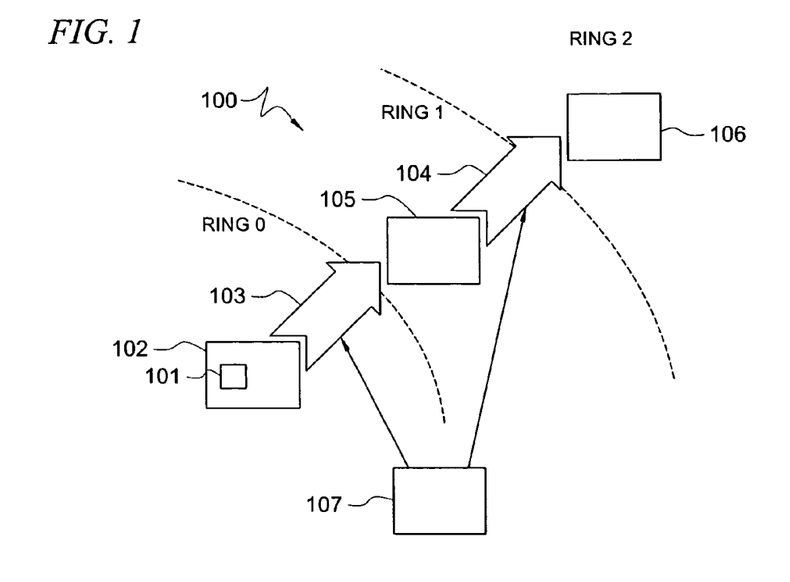
FIG. 1 is an illustration of an exemplary system adapted according to one embodiment of the invention.

FIG. 1 is an illustration of exemplary system 100 adapted according to one embodiment of the invention. In this example, processing units (represented by module 107) are adapted to instantiate an information path (represented by arrows 103 and 104) from node 101 at grid 102 to grids 105 and 106. Grids 102, 105, and 106 are assigned to hierarchical levels of trust denoted by Rings 0, 1, and 2. Ring 0 has the highest level of trust, whereas Ring 2 has the lowest level of trust.

Grids 102, 105, and 106, in various embodiments include computers, connected to one or more networks and executing grid management software. Generally, the computers can be any kind of computer, and the grid management software allows the computers to participate in the grids. An example of grid management software that can be used in some embodiments includes WS-Management™, co-developed by Advanced Micro Devices, Inc, Microsoft Corporation, and other, which is a standards-based grid management software. The rings of trust and module 107 are described in more detail below.

Figure 2:
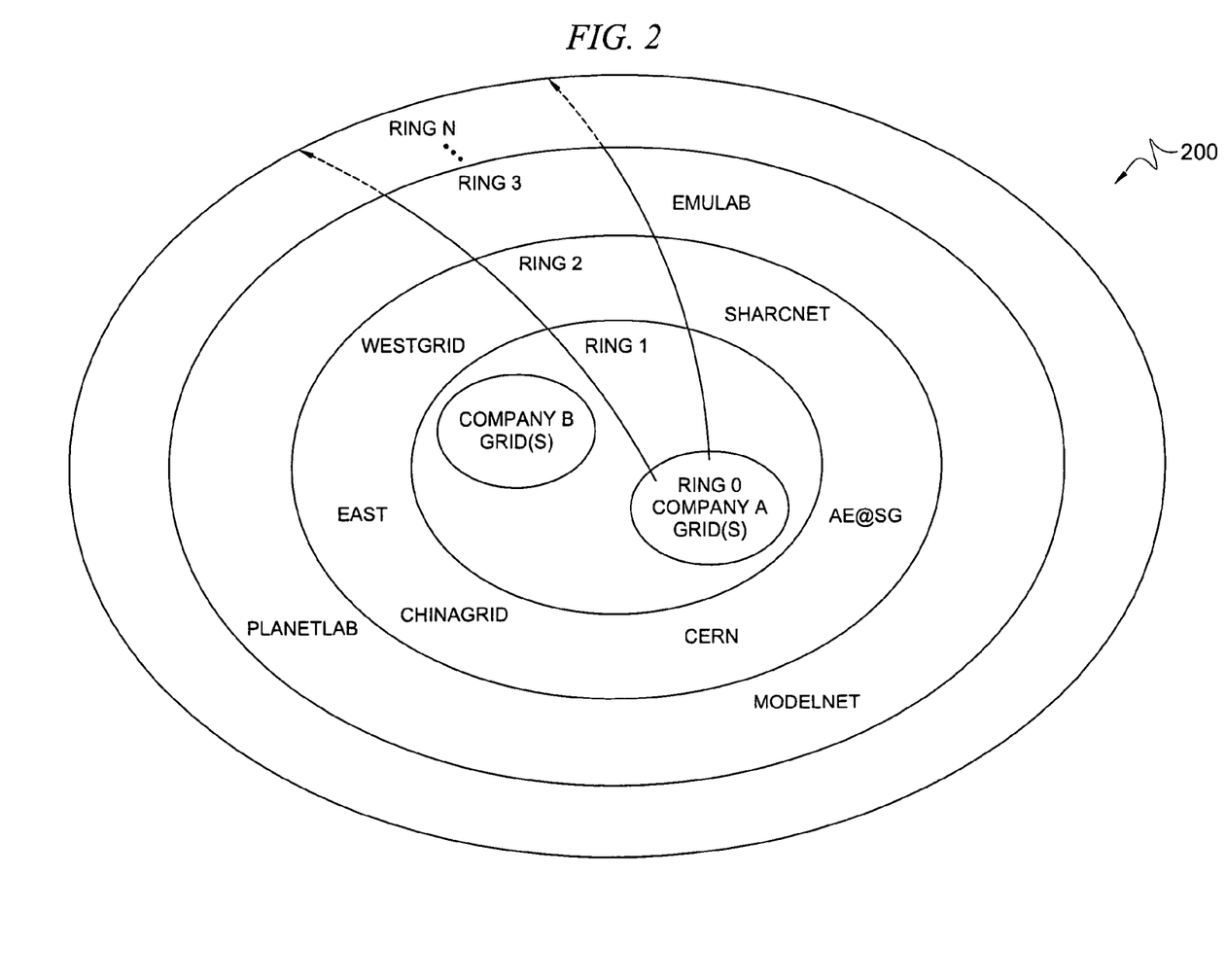
FIG. 2 is an illustration of an exemplary system adapted according to one embodiment of the invention.

FIG. 2 is an illustration of exemplary system 200 adapted according to one embodiment of the invention, showing rings and grids in more detail than in FIG. 1. System 200 includes N rings of trust, four of which are shown in detail. Each of the rings of trust provides access to or more computing grids by a node at Ring 0. For example, company A has one or more grids (not shown) in the highest trust level of the rings of trust, shown as Ring 0. The next lower trust level is shown as Ring 1, and it includes the grids of company B. Ring 2 is in a still-lower level of trust, and it includes various grids, such as ChinaGrid and WestGrid. Ring 3 includes larger and more publicly-oriented grids, such as PlanetLab. Ring N is shown to demonstrate that system 200 is not limited by the number of rings of trust or even by the number of grids. In fact, system 200 is scalable to be as large or as small as is desirable.

In this example, it is an operator of company A's grid(s) that defines the rings of trust. In fact, system 200 illustrates a path for computing requests that originate at a node at company A and can be passed through a trust hierarchy to appropriate computing resources. Defining rings of trust and determining appropriate computing resources are described further below.

In this example, the innermost ring (Ring 0) circumscribes company A, and represents the most trusted level in the hierarchy. In general, a node on an enterprise grid usually has access to most of the computing resources within that grid, since they are usually associated with the same company. Many companies may include various methods of security with their respective grids; however, that is not discussed herein.

If a user of a node at company A sends a request for processing to the grid(s) of company A, the processing request may or may not be granted depending on, for example, available resources, cost, and the like. If, for example, the request requires more computing power than is available at company A's grid(s), company A may pass the request to a grid that belongs to one of its associated companies. In this example, company A may pass the request from its grid(s) to the grid(s) of company B. Thus, the grid(s) of company A pass the request from innermost Ring 0 to lower-level Ring 1.

Ring 1 can be constructed, at least in part, by company A through negotiating an agreement to share processing resources with company B. Further in this example, company A has an interest in keeping some information secret from company B and has protocols in its grid that keep security-sensitive or business-critical information within it own grid. Examples of programs that a company may prefer to access entirely within its own grid include, among others, file servers and mail servers. In some examples, the relationship between company A and company B can be governed by agreements, including nondisclosure agreements and trade secret protection agreements, and company A, depending on its tolerance for risk and belief in company B's integrity, may define which requests can be processed by company B, including allowing more sensitive requests to be passed to company B. In various embodiments, defining which requests can be sent to other grids is decided by an operator of company A's grid(s).

If, for example, the processing request needs more processing power than is available in Ring 1, the request may be further passed to Ring 2 where the processing power of other, possibly larger grids is available. Once again, the third level of trust may be constructed, at least in part, through leveraging relationships with the operators of the grids therein. An example is providing consideration (e.g., payment in cash or reciprocal resource sharing) to the operators of such grids in order to assure access thereto.

As illustrated by system 200, Ring 3 includes public systems, such as PlanetLab and other grids that allow access to the general public. As the rings of trust go down the hierarchy, the sensitivity of the requests passed generally will decrease. Thus, the requests that are processed in Ring 4 generally have minimal sensitivity to security issues, whereas the requests processed in Ring 0 can often be highly sensitive.

Figure 3:
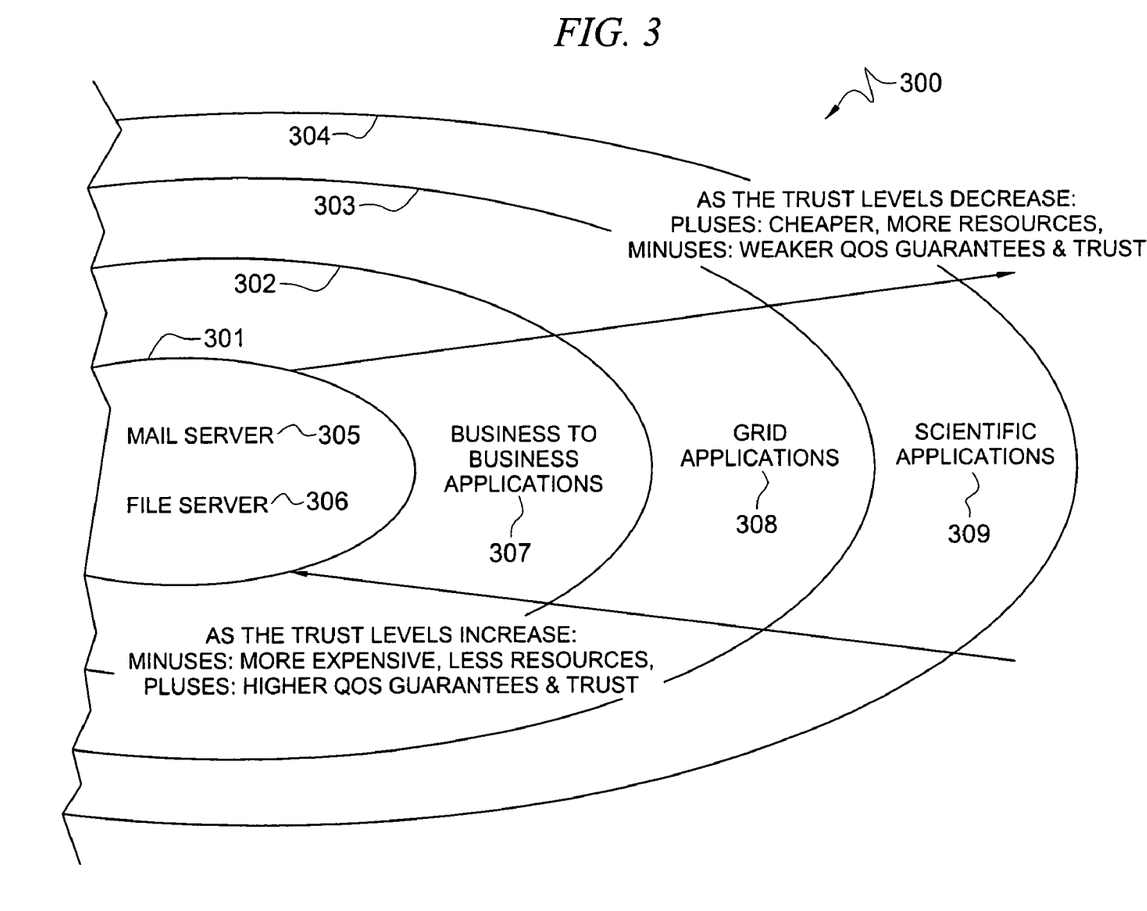
FIG. 3 is an illustration of an exemplary system adapted according to one embodiment of the invention.

FIG. 3 is an illustration of exemplary system 300 adapted according to one embodiment of the invention. System 300 includes four rings of trust—301-304—with 301 having the highest trust level and 304 the lowest. Defining rings of trust can allow a company to arrange its processing applications throughout those rings to balance cost, quality, and security. System 300 includes examples of applications that a company (e.g., company A of FIG. 2) may execute in different levels of trust. In innermost ring 301, which in this example corresponds to the company's own grid, mail server 305 and file server 306 execute. In ring 302, which in this example corresponds to a grid of an associated company, business to business applications 307 are executed. Grid-type applications 308 execute at ring 303. In ring 304, the least sensitive types of applications are run, such as scientific applications 309, which focus mainly on technical calculations.

The arrangement of applications that run in rings of trust 301-304 can be determined by company A (or the operator of its grids) based on a cost/benefit analysis. Generally, as the trust levels decrease, more resources are available and computing becomes cheaper. On the other hand, lower trust levels also generally provide weaker quality of service and trust guarantees. The reverse is generally true as the trust levels increase. The decision makers at company A can take this relationship into account when arranging the applications throughout rings of trust. It should be noted that the arrangement of FIG. 3 is exemplary only, as a given entity may arrange its computing according to various embodiments of the invention as it sees fit.

It should further be noted that rings of trust, in various embodiments, are institution-specific, such that an entity constructing a federation of grids using rings of trust can have an arrangement that is much different from an arrangement of a similar entity. For instance, company A can build a federation of grids in rings of trust, and company B (also of FIG. 2) can build its own federation as well, and the two federations may be quite different by, for example, including or omitting different grids, assigning same grids to different levels of trust, putting different restrictions in place specifying which processing requests can be passed, and the like.

Figure 4:
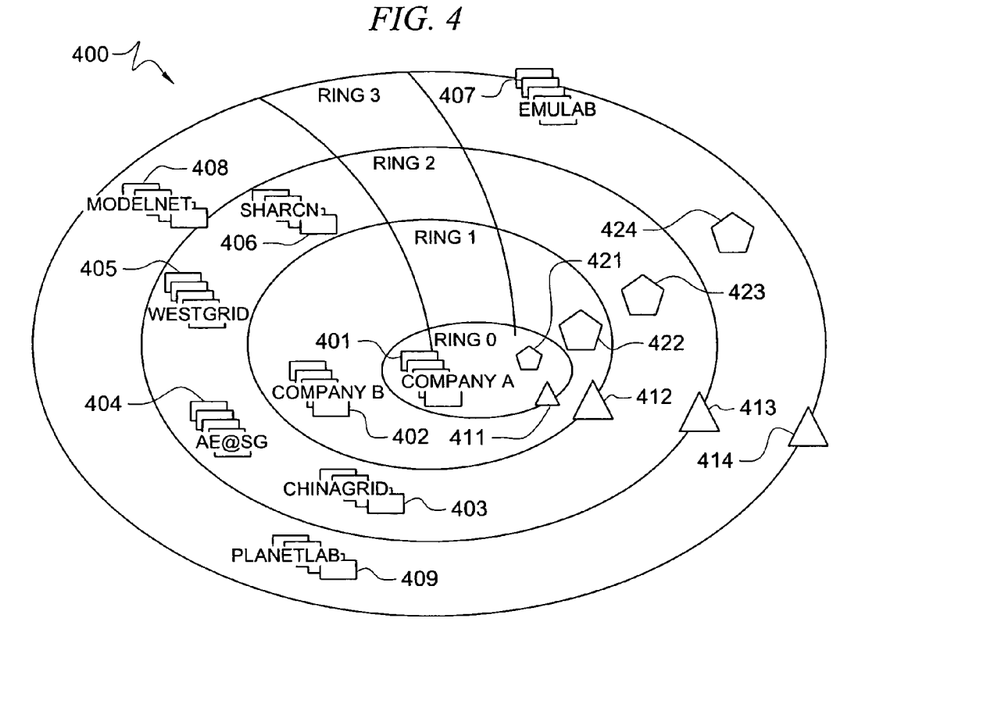
FIG. 4 is an illustration of an exemplary system adapted according to one embodiment of the invention.

FIG. 4 is an illustration of exemplary system 400 adapted according to one embodiment of the invention. As mentioned above, processing units are adapted to instantiate an information path from the nodes of a first grid to other grids through various rings of trust. System 400 includes various processing units, such as manageability endpoints 401-409, manageability services units 411-414, and ring operational management units 421-424.

In this embodiment, manageability endpoints 401-409 reside on every node participating in each grid, and each of the separate grids has its own endpoint. End node manageability points enable management of individual computers in the grids. Examples of management functions of an individual node include managing participation in the Grid, rebooting, changing operational parameters, and the like. Grid manageability end point also enable managing individual grids. Examples of management functions of a grid include managing which nodes participate in it, changing operational characteristics of the grid, and the like. Manageability services 411-414 manage service requests crossing trust boundaries (forwarding, inquiring, starting, stopping, retracting, and the like). Grid ring operation management units 421-424 determine where to forward requests within their respective rings and manage infrastructure within federated grids at a ring level, wherein infrastructure management includes, among other things, managing the participation of grids (e.g, adding and removing).

In some embodiments, manageability endpoints 401-409 can be implemented with WS-Management software or other middleware management infrastructures (e.g., OPENVIEW™, TIVOLI™, or the like). Similarly, manageability services units 411-414 can be implemented using management standards, such as WS-Management. Ring operational management units 421-424 can be based on, for example, an implementation of the OASIS™ Web Services Resources Framework (WSRF). However, various embodiments are not limited to these software products.

Further, in this example, an information ticket is passed with each request. The information ticket specifies conditions and other data that facilitate the passing of the request through the rings. TABLE 1 shows fields that may be included in an example ticket. As the request is passed, manageability endpoints (e.g., 401-409), ring operational management units (e.g., 421-424), and manageability services units (e.g., 411-414) inspect the ticket and send the request to processing resources that satisfy the criteria set out in the ticket.

TABLE 1

| FIELD NAME | APPROPRIATE ENTRY |
| --- | --- |
| okToForward | Boolean |
| ringDepthToForward | Integer |
| listOfTrustedGrids | String[ ] |
| listOfTrustedOrganizations | String [ ] |
| forwardingupdate | Integer |
| contatBeforForward | Boolean |
| signature | Integer |
| cost | Integer |

The field, "okToForward," is binary and simply specifies whether the request can be forwarded. "ringDepthToForward" sets a lowest permitted trust level to which the request may be forwarded. "listOfTrustedGrids" specifies grids within rings that are specifically trusted for a given request. "listOfTrustedOrganizations" specifies organizations within rings that are specifically trusted for a given request. "forwardingupdate" specifies that the originating node should be updated when the request is forwarded to another ring. "contatBeforForward" specifies that permission should be sought from the originating node before the request can be forwarded to another ring. "signature" identifies the originating node and nodes to which the request is forwarded. "cost" specifies a maximum cost (e.g., in US dollars) for processing the request. These fields are exemplary, as other fields may be used in various embodiments as defined by a Ring 0 grid operator.

In system 400, when a node at company A has a processing request, unit 421 inspects the request and its ticket. It compares the criteria on the ticket to cost and availability of resources in Ring 0. If, for any of a variety of reasons (e.g., cost, resource availability), the request unit 421 determines that the request cannot or should not be processed in Ring 0, it sends the request to unit 411.

Unit 411 determines whether it is appropriate to send the request to the next lower ring level. If not, unit 411 returns the request to unit 421. If it is appropriate, then unit 411 sends the request to unit 422, which compares the criteria on the ticket to cost and availability of resources in Ring 1. The process can be repeated until the lowest ring is reached.

In an example, the ticket specifies a particular grid, company, or ring level and various ring operational management units 421-424 and manageability services units 411-414 cooperate to send the request thereto. In another example, the ticket specifies a price for processing, and ring operational management units 421-424 and manageability services units 411-414 cooperate to forward the request to processing resources that have a cost at or below the specified price. One or more criteria can be specified in the ticket to assure appropriate processing.

Although FIG. 4 depicts manageability endpoints 401-409, ring operational management units 421-424, and manageability services units 411-414 as separate processing units, various embodiments of the invention are not so limited. For example, it is possible to integrate the functionality of units 411 and 421 (or 411 and 422, or other combinations of ring operational management units and manageability services units). It is also possible to integrate the functionality of ring operational management units 421-424 and manageability services units 411-414 into one or more units located in Ring 0. In fact, various techniques of integration or separation are possible when designing and instantiating a grid federation according to various embodiments of the invention.

In the embodiment of FIG. 4, the configuration of the grid federation is defined by individual organizations. One technique that an entity may use to configure a grid federation is to provide processing units (hardware and/or software to perform the functions of ring operational management units and manageability services units) to the various grids that will make up the federation. Because many large companies already have agreements in place with outside grid operators and, in some instances, own processing resources within those grids, this technique may be accomplished by such a company by designing a federation and uploading and executing software on computers within those grids to perform the functions of ring operational management units and manageability services units. The hardware and software performing the functions acts to instantiate the federation and the rings of trust.

It is also possible that various grid operators or third parties may provide hardware and software that is used to instantiate federations and rings of trust. Regardless of which entities provide the hardware and software to instantiate the configurations, such configurations are generally designed by agreements between a company (e.g., company A) seeking to establish its own federation to increase its computing power and the various grid operators. Such agreements usually specify cost, quality of service, scheduled use, security, and the like. Such information can then be used by the ring operational management units and manageability services units to instantiate the federation and rings of trust.

In various embodiments, modifications can be made to the configuration throughout operation. For instance, company A may terminate relations with one or more grids and may send information to appropriate ring operational management units to delete those grids from its list of available grids. Additionally or alternatively, a grid may remove itself from a list of available grids by sending a message to appropriate ring operational management units. Adding and removal is usually based on agreements and can even be performed on a time schedule, for example, by informing appropriate ring operational management units to add and/or remove certain grids on a schedule.

Returning to FIG. 2, parties may share federations or portions of federations. In one example, company A shares Rings 2 and 3 with company B. (Since system 200 is drawn from the perspective of the Ring 0 entity—company A,—it does not imply that Rings 2 to N can be used by company B. Rather, it indicates that company B's grid has been assigned a ring in company A's federation.) This can be based on an agreement between the two companies. Additionally or alternatively, company B can share any of its own rings with company A. In fact, the two companies can agree to allow some of their rings to communicate by establishing a communication protocol between them.

Returning to FIG. 4, intelligence can be included in manageability endpoints 401-409, ring operational management units 421-424, and manageability services units 411-414 to aid in the instantiation of the federation and in passing requests. For instance, it is possible to program ring operational management units 421-424 to negotiate agreements with grids in its respective ring, by, for example, setting a desired price and a maximum price for processing a request and allowing the ring operational management unit to communicate with grids to find the best cost.

Ring operational management units 421-424 can also be programmed to match different types of processing requests to certain costs in addition to or in the absence of cost criteria in the ticket. In that way, ring operational management units 421-424 can forward a request to a particular processing resource based on the type of request and the cost of the processing resource. Alternatively, a given ring operational management unit can forward a request on to the next ring if no cost-appropriate resources can be found in its own ring.

Further, ring operational management units 421-424 can be instructed to cache, for example, response time, service time, cost, and the like for each of the grids in their respective rings. Each ring operational management unit 421-424 can then use that information to determine which of the grids in its ring should receive a processing request. Additionally, ring operational management units 421-424 and manageability services units 411-414 can be used to identify potential conflicts. For example, even though company A and company B (FIG. 1) have agreements in place, company A may have information that it does not want company B to access. Accordingly, ring operational management units 421-424, and manageability services units 411-414 can be programmed to bypass company B's grids for certain types of processing requests. This is in addition to information in the request tickets that can also be used to keep some processing requests from some rings, grids, or companies.

Figure 5:
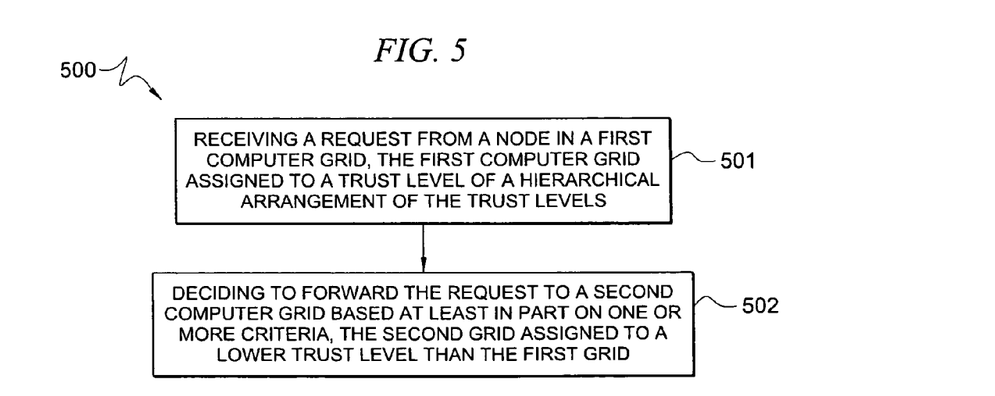
FIG. 5 is an illustration of an exemplary method for sharing computer resources, adapted according to one embodiment of the invention.

FIG. 5 is an illustration of exemplary method 500 for sharing computer resources, adapted according to one embodiment of the invention. Method 500 may be performed, for example, by a ring operational management unit (e.g., 421-424 of FIG. 4) and/or a manageability services unit (e.g., 411-414 of FIG. 4) or other processing unit adapted to facilitate sharing of computer resources.

In step 501, the processing unit receives a request from a node in a first computer grid, the first computer grid assigned to a trust level of a hierarchical arrangement of trust levels. An example of a hierarchical arrangement of trust levels is shown in system 100 of FIG. 1.

In step 502, the processing unit decides to forward the request to a second computer grid based at least in part on one or more criteria. Further, the second grid is assigned to a lower trust level than the first grid.

In some embodiments, deciding to forward the request based at least in part on one or more criteria includes parsing ticket information in the request and comparing criteria in the ticket information to one or more characteristics of the first ring, the second ring, and/or processing resources in either or both of the rings. Then the deciding is based, at least in part, on determining that passing the request satisfies the criteria (or at least does not violate a criterion). In one example, the ticket specifies a maximum cost for processing. Thus, the deciding may include determining that computing resources in the first grid exceed the maximum price. In another example, the ticket information includes a field specifying whether it is permitted to pass the request to a lower level grid. In that case, the deciding includes at least verifying that passing the request is permitted. Various criteria may be included in the ticket information, and embodiments of the invention are not limited to any particular criteria. Alternatively to or in addition to using criteria included in ticket information in the request, the hardware and/or software performing the deciding may base the deciding on its own programmed criteria.

Various embodiments of the invention provide one or more advantages over prior art systems. For instance, it is possible to enable better sharing of resources from each individual node's perspective because of the ability to utilize resources from anywhere in the federation of various grids at the same or even a different level of trust. This is in contrast to previous solutions, which merely enable two individual grids to share resources.

Another advantage of some embodiments is optimizing a degree of service by forwarding service and job requests to other grids for reduced cost, increased or decreased security, and the like. Because there is significantly more sharing than in prior art systems, each user can get access to significantly more resources, while at the same time maintaining the desired level of cost and security.

Yet another advantage of some embodiments is that each organization can design, instantiate, and dynamically manage its grid federation. Further, this can be performed at the grid granularity level, giving organizations the ability to pick and choose among individual grids for service.

When implemented via computer-executable instructions, various elements of embodiments of the present invention are in essence the software code defining the operations of such various elements. The executable instructions or software code may be obtained from a readable medium (e.g., a hard drive media, optical media, EPROM, EEPROM, tape media, cartridge media, flash memory, ROM, memory stick, and/or the like) or communicated via a data signal from a communication medium (e.g., the Internet). In fact, readable media can include any medium that can store or transfer information.

Figure 6:
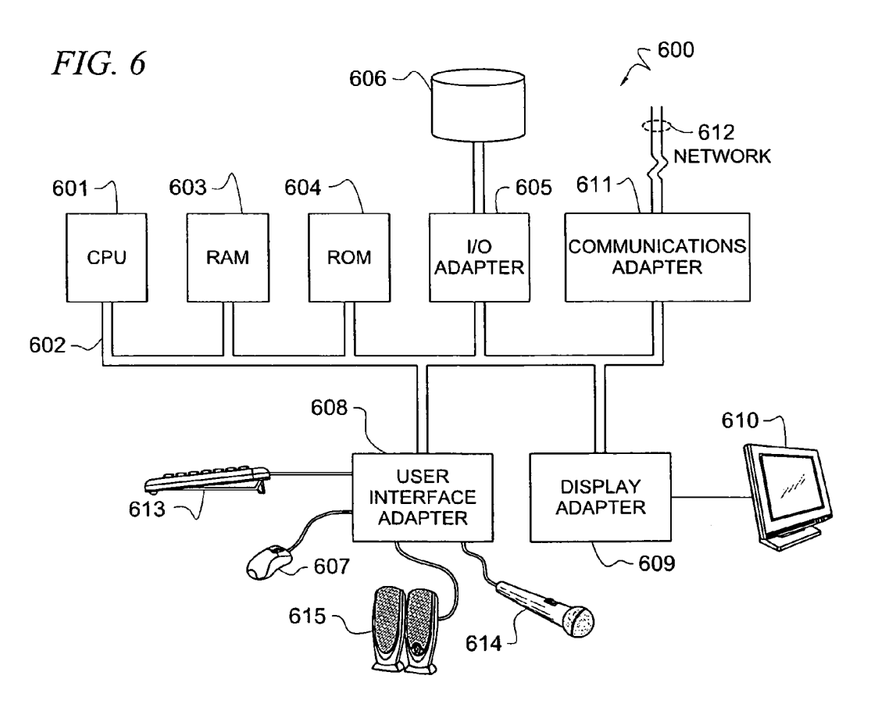
FIG. 6 illustrates an example computer system adapted according to one embodiment of the present invention.

FIG. 6 illustrates an example computer system 600 adapted according to one embodiment of the present invention. That is, computer system 600 comprises an example system on which embodiments of the present invention may be implemented (such as manageability endpoints 401-409, ring operational management units 421-424, and manageability services units 411-414 of the example implementation of FIG. 4, various nodes in grids, and the like). Central processing unit (CPU) 601 is coupled to system bus 602. CPU 601 may be any general purpose CPU. However, the present invention is not restricted by the architecture of CPU 601 as long as CPU 601 supports the inventive operations as described herein. CPU 601 may execute the various logical instructions according to embodiments of the present invention. For example, CPU 601 may execute machine-level instructions according to the exemplary operational flow described above in conjunction with FIG. 5.

Computer system 600 also preferably includes random access memory (RAM) 603, which may be SRAM, DRAM, SDRAM, or the like. Computer system 600 preferably includes read-only memory (ROM) 604 which may be PROM, EPROM, EEPROM, or the like. RAM 603 and ROM 604 hold user and system data and programs, as is well known in the art.

Computer system 600 also preferably includes input/output (I/O) adapter 605, communications adapter 611, user interface adapter 608, and display adapter 609. I/O adapter 605, user interface adapter 608, and/or communications adapter 611 may, in certain embodiments, enable a user to interact with computer system 600 in order to input information, such as processing requests, specifications for ticket information, communications with manageability endpoints, ring operational management units, and manageability services units, and the like.

I/O adapter 605 preferably connects to storage device(s) 606, such as one or more of hard drive, compact disc (CD) drive, floppy disk drive, tape drive, etc. to computer system 600. Communications adapter 611 is preferably adapted to couple computer system 600 to network 612 (e.g., thereby connecting a node to other nodes in a grid, connecting grids to each other and to other processing units, connecting one or more processing units to the Internet, and the like). User interface adapter 608 couples user input devices, such as keyboard 613, pointing device 607, and microphone 614 and/or output devices, such as speaker(s) 615 to computer system 600. Display adapter 609 is driven by CPU 601 to control the display on display device 610 to, for example, display a user interface of embodiments of the present invention.

It shall be appreciated that the present invention is not limited to the architecture of system 600. For example, any suitable processor-based device may be utilized, including without limitation personal computers, laptop computers, computer workstations, and multi-processor servers. Moreover, embodiments of the present invention may be implemented on application specific integrated circuits (ASICs) or very large scale integrated (VLSI) circuits. In fact, persons of ordinary skill in the art may utilize any number of suitable structures capable of executing logical operations according to the embodiments of the present invention.

What is claimed is:

1. A method for using computer resources, said method comprising:

receiving, at a processor, a processing request from a first node in a first computer grid that is part of a plurality of computer grids, said computer grids of the plurality assigned to corresponding different trust levels; and passing, by the processor, said request to computer resources in a second computer grid of the plurality of computer grids, said second computer grid assigned to a lower trust level than a first trust level assigned to the first computer grid, wherein the request is passed to the second computer grid based on a cost criterion and one or more security criteria associated with the request, the one or more security criteria selected from among information identifying one or more trusted computer grids of the plurality of computer grids and information identifying one or more trusted organizations associated with the plurality of computer grids, and wherein passing said request to said second computer grid is based on determining that said cost criterion cannot be satisfied by said first computer grid assigned to said first trust level.

2. The method of claim 1 further comprising:
associating additional information to accompany said request, said additional information specifying permission to pass said request to said lower hierarchical trust level.

3. The method of claim 1 further comprising:
determining that a cost of processing said request by said second computer grid satisfies said cost criterion; and
processing said request based on said determining.

4. The method of claim 1 further comprising:
determining, based on said cost criterion and said one or more security criteria, that said request should be forwarded to a third computer grid of the plurality of computer grids, said third computer grid defined in a lower hierarchical trust level than said second computer grid; and
passing said request to computer resources in the third computer grid.

5. The method of claim 4 wherein said request is further associated with one or more of:
a resource availability criterion and a quality of service criterion.

6. The method of claim 1 wherein said different trust levels are defined by an operator of said first computer grid.

7. The method of claim 1 further comprising:
examining said request by said computer resources in said second computer grid and determining an appropriate third computer grid having a lower trust level than the trust level of said second computer grid for processing of said request in response to determining that said cost criterion cannot be satisfied by said second computer grid.

8. The method of claim 1 further comprising:
requesting permission from said first node for said passing; and
updating said first node of said passing.

9. The method of claim 1, further comprising:
associating additional information with the request, the additional information setting a lowest permitted trust level of the different trust levels to which said request can be forwarded.

10. A computer program product having a non-transitory computer readable medium having computer program logic recorded thereon for sharing computer resources, said computer program product comprising:
code for receiving a request from a node in a first computer grid, said first computer grid assigned to a trust level of a hierarchical arrangement of trust levels; and
code for deciding to forward said request to a second computer grid based at least in part on one or more criteria, said second grid assigned to a lower trust level than said first grid.

11. The computer program product of claim 10, further comprising:
code for determining that a cost of processing said request by said second computer grid satisfies said cost criterion.

12. The computer program product of claim 10 further comprising:
code for determining, based on said cost criterion and said one or more security criteria, that said request should be forwarded to a third computer grid of the plurality of computer grids, said third computer grid defined in a lower hierarchical trust level than said second computer grid; and
code for passing said request from said second computer grid to computer resources in said third computer grid.

13. The computer program product of claim 10 wherein said request is further associated with one or more of:
a resource availability criterion and a quality of service criterion.

14. The computer program product of claim 10 further comprising:
code for negotiating a cost for processing said request with said second computer grid.

15. The computer program product of claim 10, wherein said code for deciding comprises:
code for determining a type of said request; and
code for matching said type to said cost criterion in the absence of cost criterion included in information in said request.

16. The computer program product of claim 10, further comprising:
code for identifying potential conflicts that exist with regard to processing said request by said second computer grid.

17. The computer program product of claim 10, wherein the request is further associated with information setting a lowest permitted trust level in the hierarchical arrangement of trust levels to which the request can be forwarded.

18. A system for sharing computer resources, said system comprising:
a node in a first computer grid that is part of a plurality of computer grids; and
one or more processing units configured to instantiate an information path from said node to computing resources of plural other computer grids of the plurality of computer grids, said information path configured as hierarchical rings of trust such that each computer grid of said plural other computer grids is assigned to a corresponding one of a plurality of hierarchical trust levels,
wherein the one or more processing units are configured to process a request issued by the node based on a cost criterion and one or more security criteria associated with the request wherein the one or more security criteria are selected from among information identifying one or more trusted computer grids of the plurality of computer grids and information identifying one or more trusted organizations associated with the plurality of computer grids, and
wherein the one or more processing units are configured to process the request by:
determining that the cost criterion cannot be satisfied in the first computer grid that is associated with a first of the trust levels; and
in response to determining that the cost criterion cannot be satisfied by the first computer grid, forwarding the request to a second of the plurality of computer grids that is associated with a second, different one of the trust levels, wherein the second computer grid is associated with a lower cost than the first computer grid.

19. The system of claim 18 wherein said hierarchical rings of trust include:
said first computer grid in a highest trust level, said first computer grid being a private enterprise system configured to originate processing requests in said information path;
said second computer grid in a trust level lower than said highest trust level, said second computer grid being another private enterprise system; and
a third of the computer grids in a trust level lower than said trust level of said second computer grid, said third computer grid being a public computer grid.

20. The system of claim 18 wherein said one or more processing units include:
an endpoint unit at said node configured to manage said node in said first computer grid;
a manageability services unit configured to pass said request from a first one of said rings of trust to a second one of said rings of trust; and
an operational management unit configured to receive said request from said manageability services unit and to forward said request to the second grid in said second ring of trust.

21. The system of claim 20 wherein said manageability services unit is a computer program executed on a computer at a boundary between said first and second rings of trust and wherein said operational management unit is a computer program executed on a computer in said second ring of trust.

22. The system of claim 18 wherein at least one of said plurality of computer grids includes a plurality of computers interconnected through one or more networks, each of said computers executing grid management software.

23. The system of claim 18, wherein the request is further associated with information setting a lowest permitted trust level in the plurality of hierarchical trust levels to which the request can be forwarded.

* * * * *

UNITED STATES PATENT AND TRADEMARK OFFICE
CERTIFICATE OF CORRECTION

| | | |
|---|---|---|
| PATENT NO. | : 8,019,871 B2 | Page 1 of 1 |
| APPLICATION NO. | : 11/494101 | |
| DATED | : September 13, 2011 | |
| INVENTOR(S) | : Dejan S. Milojicic | |

It is certified that error appears in the above-identified patent and that said Letters Patent is hereby corrected as shown below:

In column 10, line 55, in Claim 18, delete "request" and insert -- request, --, therefor.

Signed and Sealed this
Twentieth Day of November, 2012

David J. Kappos
*Director of the United States Patent and Trademark Office*